(12) United States Patent
Fletcher

(10) Patent No.: US 6,416,010 B2
(45) Date of Patent: *Jul. 9, 2002

(54) CABLE INSTALLING METHOD AND APPARATUS

(76) Inventor: Douglas D. Fletcher, 239 Tennessee Ave., Alexandria, VA (US) 22305

( * ) Notice: Subject to any disclaimer, the term of this patent is extended or adjusted under 35 U.S.C. 154(b) by 0 days.

This patent is subject to a terminal disclaimer.

(21) Appl. No.: 09/881,682

(22) Filed: Jun. 18, 2001

Related U.S. Application Data

(62) Division of application No. 09/333,281, filed on Jun. 15, 1999, now Pat. No. 6,267,355.

(51) Int. Cl.[7] ............................................. B65H 27/00
(52) U.S. Cl. ...................... 242/397; 242/557; 242/566; 242/615.3; 242/157 R; 254/134.3 R
(58) Field of Search ................................ 242/403, 397, 242/566, 615, 615.3, 557, 157 R; 254/134.3 R

(56) References Cited

U.S. PATENT DOCUMENTS 5,509,671 A * 4/1996 Campbell ................ 242/557 X
6,267,355 B1 * 7/2001 Fletcher ................... 242/615 X

* cited by examiner

Primary Examiner—John Q. Nguyen

(57) ABSTRACT

A method for installing cable in a building wherein the cable is to be pulled from a central room or closet to multiple outlets in multiple offices, the method comprising providing a spool of cable to be installed, providing a cable guide device having a plurality of apertures therein and identifying indicia thereon for identifying the apertures and corresponding to the outlets to which the cable is being installed, inserting the free end of the cable through an aperture in the cable guide device, pulling the cable through the guide member to the outlet whose identification corresponds to the identifying indicia for the opening in the cable guide member through which the cable was pulled; also a cable guide member and a cable installation cart which supports multiple spools of cable to be installed and one or more cable guide having removable indicia thereon.

7 Claims, 6 Drawing Sheets

CABLE INSTALLING METHOD AND APPARATUS

This application is a divisional of co-pending application Ser. No. 09/333,281, filed on Jun. 15, 1999, U.S. Pat. No. 6,267,355, the entire contents of which are hereby incorporated by reference and for which priority is claimed under 35 U.S.C. § 120; and this application claims priority of application No. filed in on under 35 U.S.C. § 119.

This invention relates to a method and apparatus for installing cabling such as data cables and telephone cables. More particularly this invention relates to a method and apparatus which greatly facilitates the installation of cables in buildings.

BACKGROUND AND OBJECTS OF THE INVENTION

The installation of cables in buildings such as office buildings is a very important aspect of modem building construction. With the use of computers, data terminals, credit card verifiers, telecommunication systems, and the like being so commonplace in buildings, the installation of the cables needed for such systems has become an extremely important aspect of both new construction and old building renovation. Modem offices often utilize duplex wall fixtures which contain outlets for both telephones and computer networks. And, older buildings which undergo renovation for new tenants, or simply undergo modernization, must have cables installed as part of the upgrading process in order to compete for tenants.

The installation of cables is a rather labor intensive process and ordinarily requires that cables be run or "pulled" from a central closet or computer room to the locations of wall outlets. Typically, a new office building will have at least one, and perhaps two duplex outlets on each wall. Each duplex outlet would likely have both a data cable and a voice cable pulled from a central room or closet to the outlet. Thus, in a simple office having four walls, with one outlet on each of two walls, there would be two outlets requiring four cables to be pulled from the closet to the office. On a given floor in each building, there may be any number of offices, each requiring four cables. Since it is far easier to install the cables during the initial construction stage of a building, the tendency is to install more cables than will be needed, in order to create flexibility into the possible layout of the office, especially in offices designed for high density modular furniture.

Large spools of cables are generally placed in the central room, and the cable is generally pulled from the spools, through the ductwork or chase through ceiling space or raised flooring to the particular office location according to the building plan. Generally an installer will start with the farthest room first and work toward the shortest pull. However, the pulling order used by the installer usually does not coincide with the numbering order of the outlets on the plans. In other words, outlet number one may not necessarily be the first cable pulled. In fact, this would most likely be coincidence rather than intentional.

Once the cables are pulled, the ends of the cables in the offices are readily recognizable by referring to the outlets, since both on the plans and on the outlets and sometimes even the walls, the outlets are numbered for reference. This helps maintain a degree of consistency so that one can tell which outlet in a telephone system, for example, should be wired to a particular terminal on the central telephone unit. Unfortunately, the ends of the cables in the "computer room" or "telephone closet" are generally merely cut to a length sufficient to enable connection at any location in that room or closet, and the installer moves right on to the next cable pull. This leaves a large quantity of excess cable which eventually will be cut off at the proper length. However, the ends are often not marked in any way or are simply marked with a piece of tape, so that when the telephone or computer network installer arrives to install the necessary hardware, he must determine which end in a large bundle of taped ends is associated with which outlet. This is usually a trial and error step which can be very time consuming, particularly in large closets with hundreds of cables running to different offices. Thus, even when the ends of the cables are marked in some way, the markings are often lost or mislabeled. Although a different color cable is ordinarily used for data cables than for voice cables, and this helps to reduce the selection process, much is left to trial and error in the overall process. In addition, it is not unusual for the number of outlets or the numbering of the outlets to change after plans are drawn, or even after cables are pulled, and this can contribute to confusion in the computer room and errors in the installation.

Regardless of how the cables have been pulled and identified in the past, the hardware installer has been obliged to work with a random array of numbered cables, which still had to be terminated or connected in a specific order.

Thus, a primary object of the present invention is to provide an improved method and apparatus for installing cabling in buildings.

A further object of the invention is to provide a method for installing cabling which greatly reduces the time required to properly connect cables.

Still another object of the invention is to provide a method for installing cabling which provides a cable numbering at the closet end of the cables which corresponds to the numbering of the respective cable outlets.

Yet a further object of the invention is to provide a method for installing cabling in a building which facilitates installation of the cables in an orderly manner.

Another object of this invention is to provide a method for installing cabling in a building in which the cables are arranged in a neat and orderly fashion, improving the appearance of the work and the labor costs involved in the installation.

Still a further object of the invention is to provide an apparatus for installing cabling in a building which facilitates pulling the cables in a desired sequence and enables reordering that sequence after the cables have been pulled.

Another object of the invention is to provide an apparatus for installing cabling in a building whereby cables may be pulled from spools and numbered as they are pulled.

Yet another object of the invention is to provide an apparatus for numbering cables during installation of the cables in a building, and permitting easy changing of the numbering after the cable has been pulled.

Still a further object of the invention is to provide an apparatus which enables multiple cables to be pulled to different outlets simultaneously while maintaining the desired numbering of the cables.

These and other objects and advantages of the invention will become apparent from the following description of the invention when considered with the accompanying drawings and claims.

DESCRIPTION OF THE INVENTION

According to the present invention, there is provided a cart for carrying a plurality of spools of cable to be used in the cabling process. The cart is highly flexible, and capable of supporting the spools at different heights according to the particular cable run being pulled. The cart is supported on wheels so as to be easily movable to suitable locations, and the cart carries at one end a pair of vertical upright support members. At their lower ends, the upright members may be provided with adjustable, ground engaging feet which can be lowered into contact with the floor to stabilize the cart while the cable is being pulled.

At the upper ends of the upright members, a height-adjustable frame carries one or more cable guide members. The cable guide members are a particularly important part of the invention, and comprise a plurality of strips of rigid material, such a wood, plastic, or the like which are assembled and secured together. These guide members are provided with a plurality of circular openings of a diameter slightly greater than the outside diameter of the cable being pulled in the building. Each of the openings in the guide member is provided with a unique identifying indicia, for example numbers numbered sequentially, starting with 1 and continuing until all of the openings are numbered.

When the installer starts to pull cable to the first outlet, he determines the number of the outlet from the plan, and then inserts the cable into the opening numbered the same as the outlet, and then pulls the cable through the guide member, and through the walls, chases, ducts, ceilings, etc., until reaching the desired outlet. As the cable is pulled, the spools unroll, paying out cable as needed. The remote cable end is then installed, or at least secured, at the outlet numbered according to the plan, and the installer returns to the closet and cuts the cable at a point so as to leave sufficient cable to reach the desired location in the closet. The closet end of the cable remains in the guide member.

The process is repeated with the next piece of cable passing first through the numbered opening into cable guide corresponding to the number of the outlet being run, and is then pulled to the next outlet to be cabled. The process continues until all cables have been pulled from the cart, through the guide member to the desired outlet.

An important feature of the method is to remove the cable guide member from the closet-ends of the cables, while leaving the identifying indicia on the ends of the cables. This allows reuse of the cable guide member in other closets or rooms, while the identification remains intact at least until the hardware installation is completed.

According to one way of accomplishing this, the cable guide members are preferably provided with a strong, flexible covering sheet releasably secured to one of the faces of the guide members. This covering sheet is made of a material such as leather, or a suitably strong synthetic material, and is perforated by the same number of holes in the same locations as in the guide member. The numerical identifying indicia for the openings is preferably visible on both sides of the covering sheet, but the numbering sequence is reversed on opposite sides in order that the each opening has the same identifying number on each side of the flexible sheet.

The covering sheet is removably secured to the face of the guide member in any well known manner, for example by a hook-and-loop fastener or a releasable adhesive. Once all of the cables have been pulled, the rigid guide member may be removed, leaving the flexible sheet in place on the cables. This provides a numerical identifying indicia for each of the cables which corresponds to the outlet numbers. The covering sheet may be left permanently on the cables if desired, or may be removed once the installation of the hardware is completed and all connections have been made. Because of the flexibility of the covering sheet, the cables may be tightly bundled and the bundle may be pulled through a conduit, if needed, with the covering sheet in place on the cables. Or, the cable may be pulled through a wall, a cabinet, or other such structure.

In this manner, not only are the cables identified by the indicia, but they are now also arranged in an ordered array, according to the identifying indicia. Sometime the order will simply be 1, 2, 3, 4 . . . n wherein 'n' is the highest number of the indicia, but the order may also depend upon the particular equipment being installed, in which case the order can be custom configured for the equipment.

In an alternative embodiment, multiple covering sheets may be used over a cable guide member, so that after the cables have been pulled, the cables may be separated into smaller groups as indicated by the particular covering sheets. This can be particularly helpful in the case of data cable installation for some networks.

In still another embodiment, a pair of similar guide members may be mounted side-by-side, or one above the other, on the vertical upright members. One guide member can be used for data cables and the other for voice cables. Typically, voice and data cables would be of different colors. In this manner, by inserting the end of a voice cable through a numbered aperture in one of the guide members, and the end of the data cable through the same numbered aperture in the other guide members, the installer can pull both the voice and data cable to the same outlet at the same time. This facilitates installing both data and voice cables into duplex outlets, and greatly reduces the amount of time needed for such installations.

Of course a numbered guide member may also be used and left in place on the cables if desired, or multiple guide members may be joined together during cable pulling, and then separated into discrete groups after the cables have all been pulled.

DESCRIPTION OF THE DRAWINGS

The accompanying drawings, form a part of the present application and show by way of non-limiting illustration, a preferred embodiment of the invention. In these drawings.

DETAILED DESCRIPTION OF PREFERRED EMBODIMENTS

Figure 1:
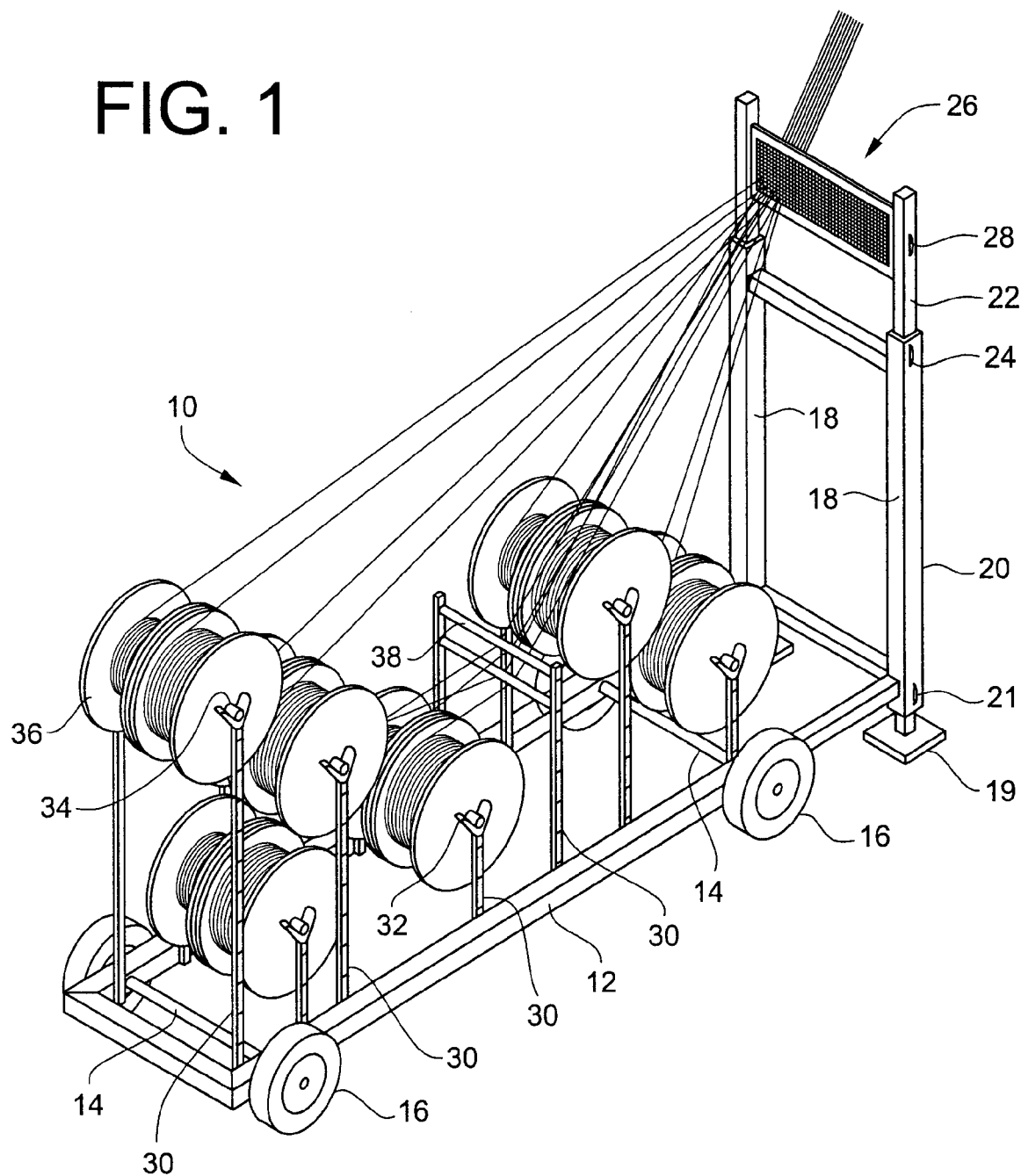
FIG. 1 is a perspective view of a cart forming a part of the invention.

Referring first to FIG. 1, a cart generally designated 10 is shown, and includes a frame 12 with a pair of axles 14 carrying wheels 16. At one end of the frame, a pair of upright vertical standard members 18 are provided. These standards are preferably made in multiple telescopic sections, such as the outer section 20 and inner section 22. Fasteners such as bolts 24 are provided and are used to secure the relative position of the inner sections 22 and the outer sections 20, and thus the height of the upper end of the inner sections 22.

At the lower ends of each vertical standard member 18, an adjustable foot 19 is provided in order to stabilize the end of the cart. The foot 19 may be adjusted to a suitable distance out of the standard member 18 and then secured by a bolt 21. Alternatively, the feet 19 may be on threaded stems which screw into fittings in the lower ends of the standards 18.

At or near the upper ends of the inner section, a cable guide member generally designated 26 is secured to the uprights 18, for example by bolts 28. The guide member 26 will be described in greater detail below.

A plurality of upright support members 30 are also provided on the frame 12, and are generally positioned in pairs. The upper ends of the support members 30 are provided with V-shaped supports 32 which are intended to support axles 34. The axles 34 pass through and support spools of cable 36 for rotation on the axles 34. In some situations, it is desirable to provide an addition cable guide member 38 to guide the cables as they pass from the spools. This cart enables a number of spools of cable, of the same or different color, to be presented for installation.

Figure 2:
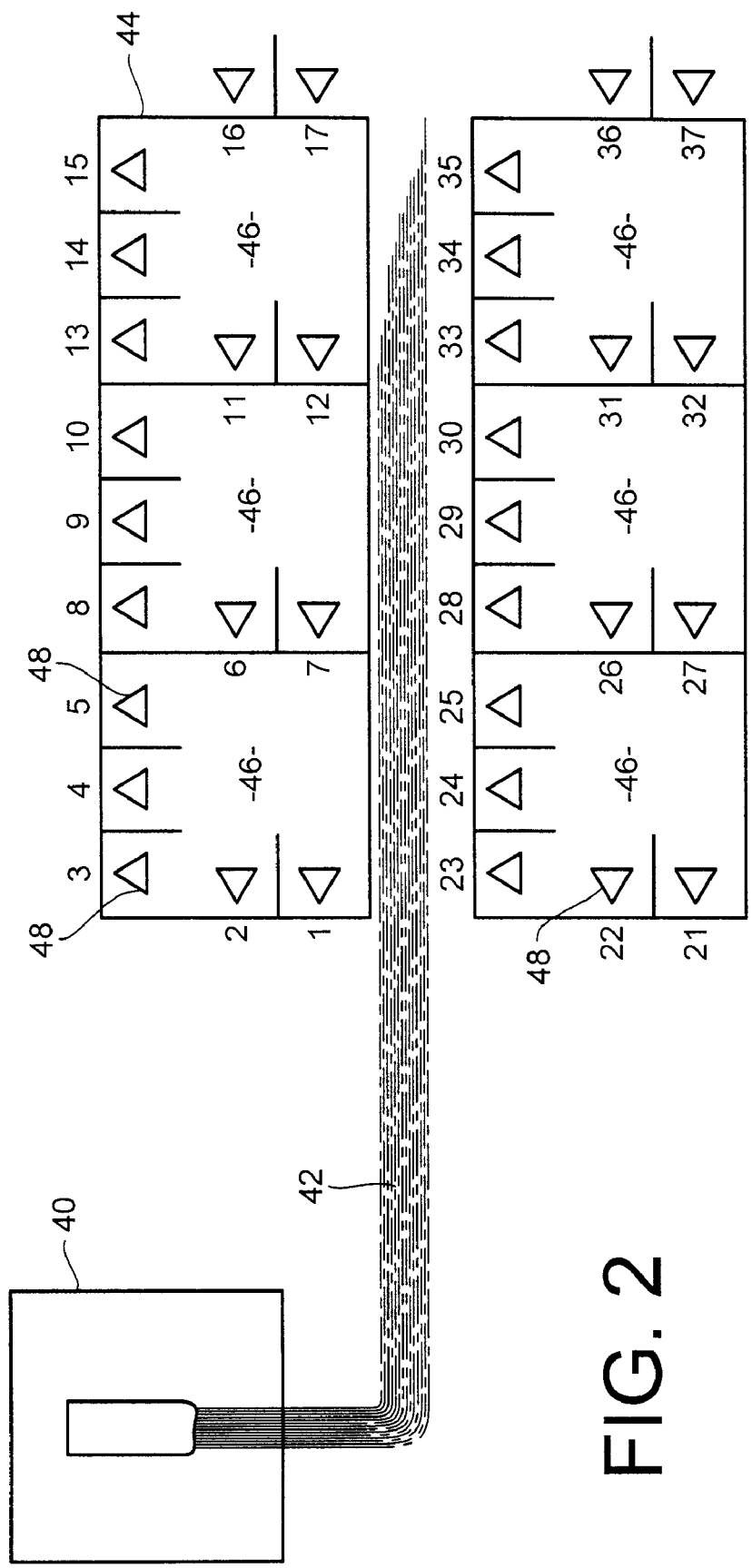
FIG. 2 is a schematic view showing the general cabling layout of a typical building plan with which the present invention is used.

The installation of cable in a building in ordinarily done according to a plan, such as a portion of the building plan. One such plan is shown in FIG. 2 wherein typical building plan designations are used to show the location of different aspects of the installation. Thus, a computer room or closet is shown as 40 with cables 42 being shown running to different portions of the floor plan 44. The floor plan 44 shows a plurality of rooms, e.g. offices 46, and each office has a triangle designating the location of duplex cable wall outlets 48. Each of the wall outlets 48 bears, on the plan, a numerical designation unique to that outlet. Most commonly, the architect merely starts at one point and numbers the outlets consecutively. The plans generally are not intended to designate the route the cables must follow, but rather the location of the ends.

Figure 3:
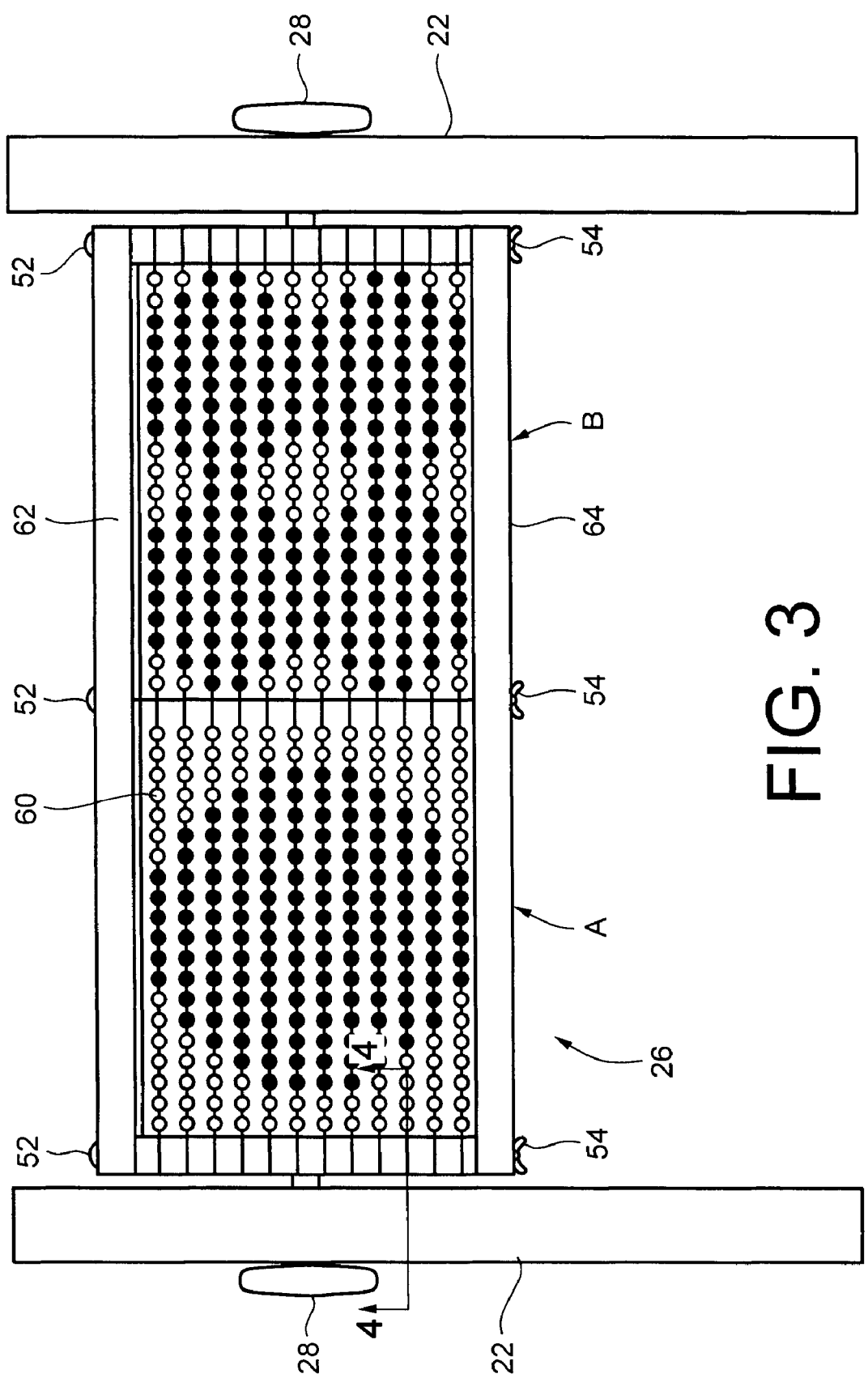
FIG. 3 is an enlarged plan view of the cable guiding portion of the cart of FIG. 1.
Figure 4:
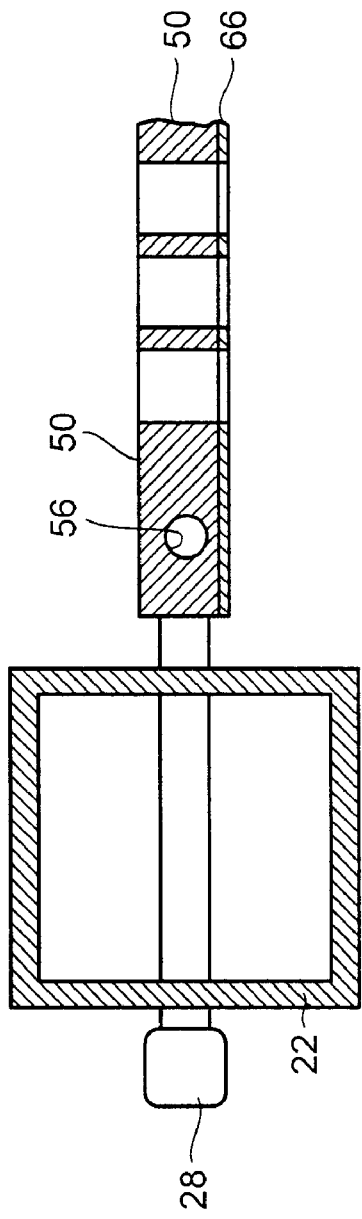
FIG. 4 is a fragmentary cross-sectional view of a portion of the cable guide frame and guide members taken along lines 4—4 of FIG. 3 and viewed in the direction of the arrows;.
Figure 5:
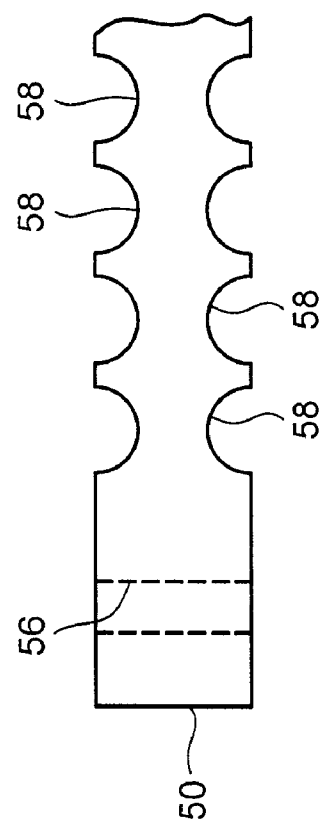
FIG. 5 is an enlarged fragmentary view of one of the strips which are assembled to make the cable guide member of FIGS. 3 and 6.

FIGS. 3, 4 and 5 show in detail the construction of the cable guide member according to the present invention. The guide member 26 is secured to and supported by the upright standards 22, and held in place by the screw 28 threaded into the side of the guide member. The guide member 26 comprises a plate-like member having a plurality of apertures therein, through which the cables are inserted during the installation, with each aperture being identified by a unique identifying indicia. Preferably the guide member 26 is made of a plurality of like strips 50 which, when assembled, form the guide member.

Figure 6:
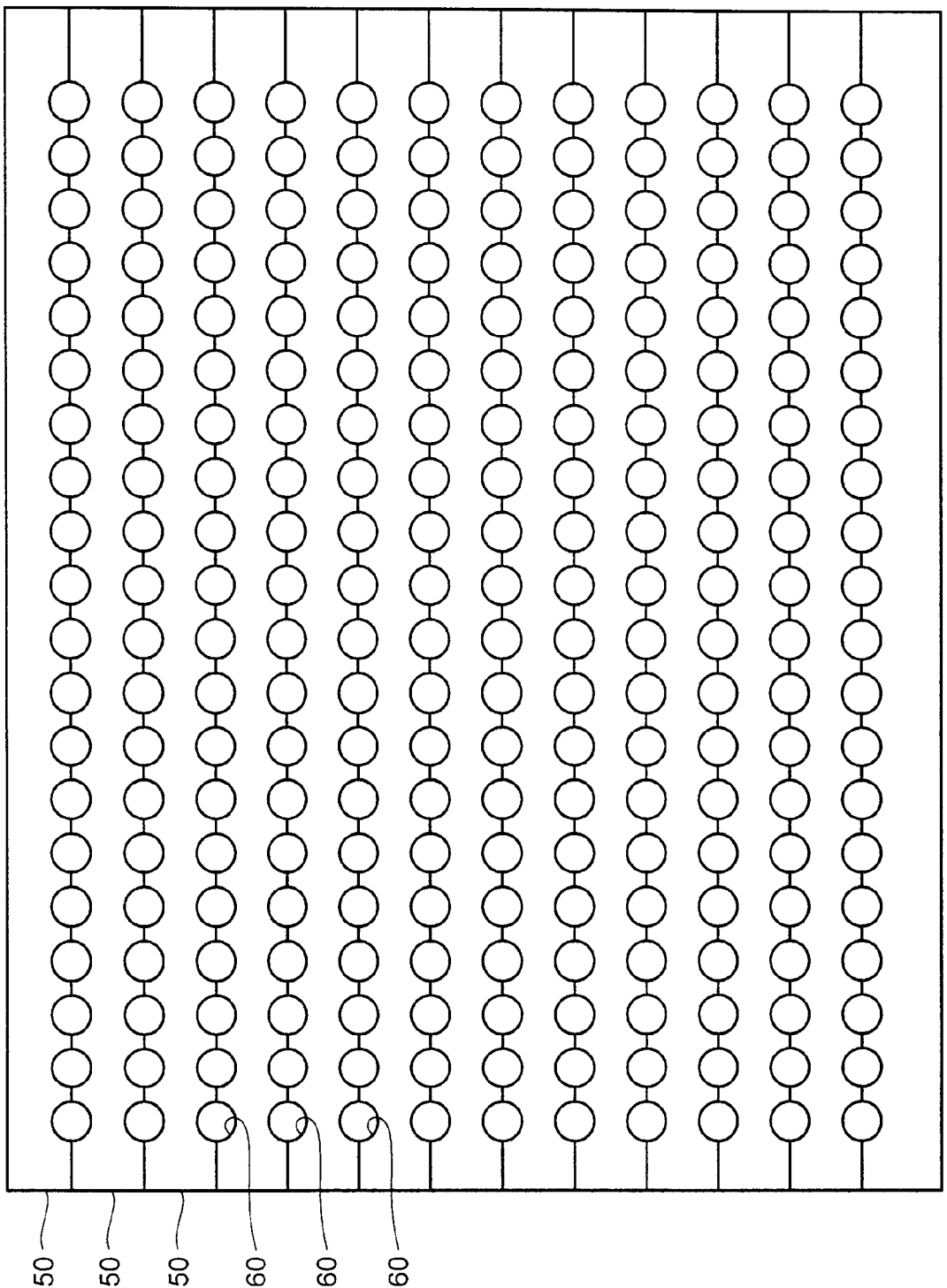
FIG. 6 is an enlarged plan view of one of the cable guide members as shown in FIGS. 1 and 3.

Thus, the strips 50 are assembled into the position shown in FIGS. 3 and 6 and secured in that position by bolts 52 which pass through openings 56 in each end of the strips 50 and wing nuts 54 . Each of the strips 50 has a plurality of semi-circular cutouts 58 formed along the top and bottom edges, such that two adjacent strips form a linear array of circular openings 60 through which the cable passes. One way of forming these cutouts is to assemble the strips and secure them with the screws 52, and then drill a series of holes along the lines at which the strips abut. The strips 50 may be made of any suitable material, such as wood, molded plastic, aluminum or steel. In any case, the holes are sized such as to easily receive the particular size of cable being installed and guide the cable as it is pulled. The holes 60 may also be chamfered on one or both faces to facilitate passing the cable through the holes 60 without scraping the insulation of the cable.

The strips 50 when secured by the bolts, form a rather rigid plate-like member, through which the cables may be readily pulled. The assembly is also bordered by upper and lower frame strips 62, 64 which help to support the assembly and keep it rigid. Of course the bolts 52 also pass through these frame strips.

Figure 7:
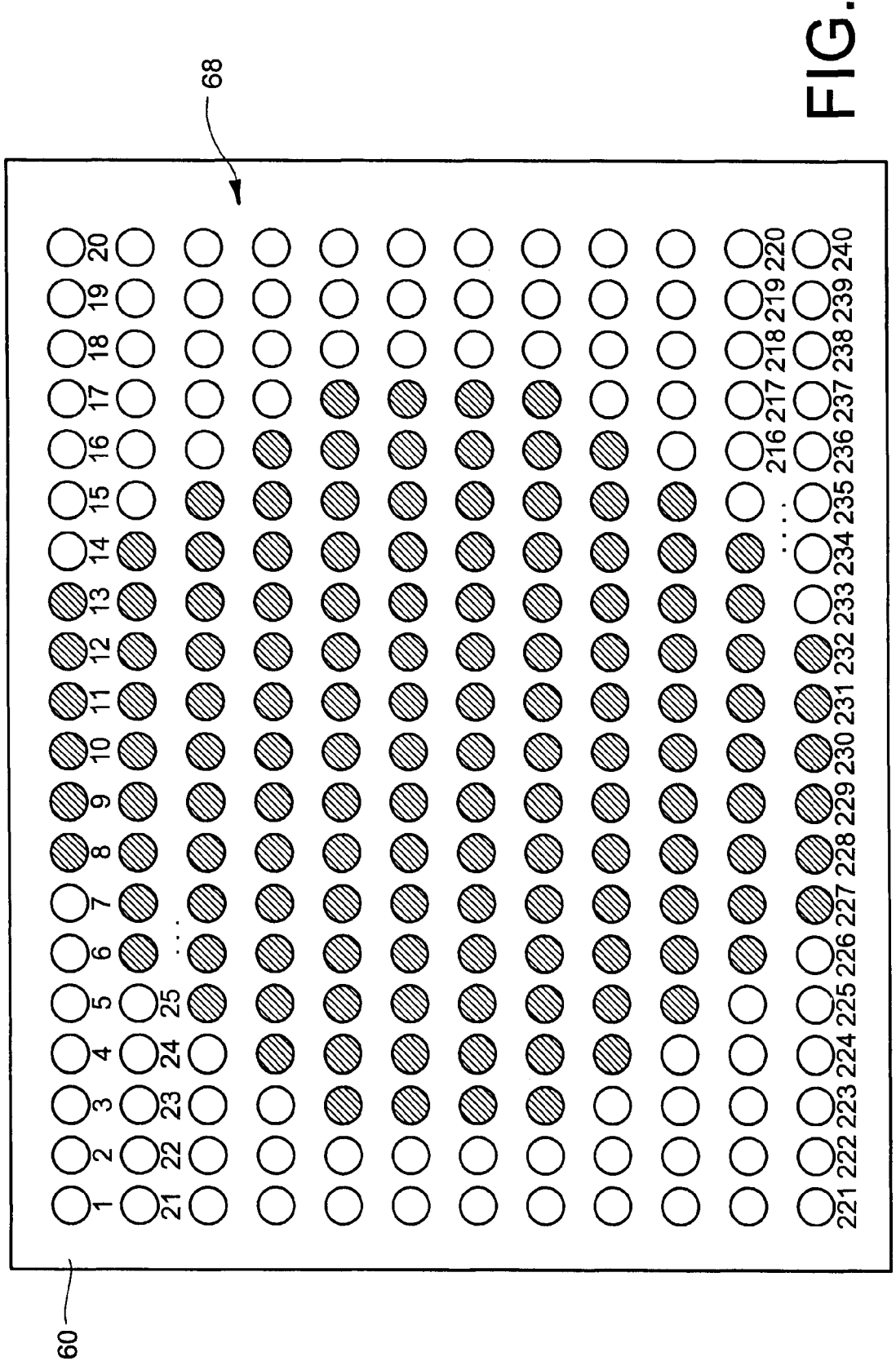
FIG. 7 is an enlarged plan view of the flexible sheet portion of the cable guide member on a bundle of cables, and bearing identifying numbers.

In a preferred embodiment, the identifying indicia is provided in a unique manner. Attached to one face of the cable guide member 26 is a flexible covering sheet 66 which also has a plurality of holes 68 passing through it in alignment with the holes 60 in the guide member. The flexible covering sheet 66 may be made of any suitable flexible, sheet-like material, such as leather, thin plastic, heavy paper or the like. Leather is preferred because of its strength and flexibility properties. As seen in FIG. 7, the holes 68 are each numbered consecutively, ordinarily starting with 1 (only some of the numbers being shown, it being understood that each aperture is numbered). The numbers may be printed or embossed onto the sheet 66, depending on what material is used to make the sheet. In use, the numbers will correspond to the numbers of the outlets to which the cables are being pulled in the building.

The covering sheet 66 may be attached to the guide member 26 by any suitable temporary attaching technique, such as a releasable adhesive, or a sheet like fastener such as a hook-and-loop fastener of the type known as Velcro®, or even two-part snaps. After all of the cables have been pulled through the guide member, the flexible sheet 66 is removed from the guide member 26. Then, wingnuts 54 are removed from the bolts 52 and the cables are removed from the guide member 26. The guide member may then be completely removed from the cables, while the flexible sheet 66 with the numerical indicia thereon, stays in place on the cables. The flexible sheet may be moved downstream on the cables, toward the outlets, or the cables may even be removed later from the flexible sheet, after the cables have been connected to the computer or telephone hardware.

As seen in FIG. 3, two different guide members may be provided, which have been labeled A and B. Each of these guide members will have its own flexible sheet with its own labeling indicia. The A guide member may be used for voice cable, for example white in color, and the B guide member may be used for blue data cable. It is not necessary that the indicia be located in the same place on the flexible sheet, but merely that both of the cables intended for outlet number 2, for example, pass through the opening in the flexible sheet numbered 2. In the event that a change is made in the outlet numbering for one or more outlets, the cable or cables affected are simply removed from the one hole and inserted into the hole bearing the new number. Similarly, if an additional out of sequence numbered outlet is added to the plan, the cable is simply pulled through the appropriately numbered hole in the flexible sheet and the guide member to the outlet.

By leaving the flexible sheet in place on the group of cables running from one particular closet or room, those cables stay neatly arranged and bundled, and retain their number. Even if the entire bundle must be pulled through a cabinet, for example, or some other structure, the flexible sheet can remain in place so that the numbering remains intact.

If it is necessary to add an additional cable or to change the number of a cable after it has been pulled, this can be easily done by removing the cable from the flexible sheet and inserting it into the aperture corresponding to the new number of the outlet. Thus a great deal of flexibility in the installation is possible.

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

What I claim is:

1. A cable guide member for aiding the installation of cables being pulled from a central room to multiple outlets in multiple offices, said cable guide member comprising a rigid plate-like member having a plurality of apertures formed therein, said apertures being of a diameter slightly greater that the outside diameter of the cable being installed, identifying indicia on said cable guide member for each of the apertures in said cable guide member, said identifying indicia being removable from said cable guide member for identifying a cable pulled through the apertures in said guide member, and said cable guide member being non-destructively removable from the cables after the cables have been installed in the apertures and pulled to the outlets.

2. A cable guide member as in claim 1 and wherein said wherein said cable guide member comprises a flexible sheet temporarily adhered to one face of said plate-like member and having apertures formed in flexible sheet coinciding with the apertures in said plate-like member, said identifying indicia being located on said flexible sheet and removable therewith from said cable guide member.

3. A cable guide member as in claim 2 and wherein said cable guide member comprises a plurality of elongated rigid strips and fastener means releasably securing said strips in side-by-side fashion.

4. A cable guide member as in claim 3 and wherein said apertures in said cable guide member comprise apertures formed in said rigid strips so that one half of each aperture is formed in each of two adjacent strips.

5. A cable guide member as in claim 2 and including a plurality of said cable guide members secured to a pair of upstanding support members.

6. A cable guide member as in claim 5 and including a pair of height adjustable feet extending from the lower end of said support members for stabilizing a cart having said support members.

7. A cable installation cart comprising a frame, wheels for movably supporting said frame, a plurality of upstanding cable spool supports extending upwardly from said frame and supporting cable spools for unspooling cable, a pair of vertical support members at one end of said frame for supporting one or more cable guide members thereon in a position to receive cable from the cable spools, said guide members comprising a plurality of apertures therein and identifying indicia thereon for identifying said apertures and corresponding to the outlets to which the cable is being installed, said identifying indicia being carried on a flexible sheet having a plurality of apertures through which said cable passes, and said flexible sheet being removably fastened to on face of said cable guide member.

\* \* \* \* \*